United States Patent
Takei

(10) Patent No.: US 10,470,039 B2
(45) Date of Patent: Nov. 5, 2019

(54) HIGHLY-SECURE WIRELESS COMMUNICATION SYSTEM

(71) Applicant: Hitachi, Ltd., Chiyoda-ku, Tokyo (JP)

(72) Inventor: Ken Takei, Tokyo (JP)

(73) Assignee: Hitachi, Ltd., Tokyo (JP)

(*) Notice: Subject to any disclaimer, the term of this patent is extended or adjusted under 35 U.S.C. 154(b) by 88 days.

(21) Appl. No.: 15/028,490

(22) PCT Filed: Oct. 18, 2013

(86) PCT No.: PCT/JP2013/078376
§ 371 (c)(1),
(2) Date: Apr. 11, 2016

(87) PCT Pub. No.: WO2015/056353
PCT Pub. Date: Apr. 23, 2015

(65) Prior Publication Data
US 2016/0255499 A1    Sep. 1, 2016

(51) Int. Cl.
| | | |
|---|---|---|
| H04W 12/02 | (2009.01) | |
| H04K 1/08 | (2006.01) | |
| H04L 9/08 | (2006.01) | |
| H04B 7/10 | (2017.01) | |
| H04B 7/22 | (2006.01) | |

(52) U.S. Cl.
CPC ........... *H04W 12/02* (2013.01); *H04B 7/10* (2013.01); *H04B 7/22* (2013.01); *H04K 1/08* (2013.01); *H04L 9/0875* (2013.01); *H04L 2209/80* (2013.01)

(58) Field of Classification Search
CPC ........... H04L 2209/80; H04L 27/2637; H04L 5/0021; H04L 27/2601; H04L 25/0202; H04L 27/2646; H04L 5/0007; H04L 5/0073; H04L 9/00; H04B 1/7174; H04B 7/0697; H04B 7/12; H04J 14/0298; H04K 1/00
See application file for complete search history.

(56) References Cited

U.S. PATENT DOCUMENTS

| | | | | |
|---|---|---|---|---|
| 2002/0181439 | A1* | 12/2002 | Orihashi | H04J 3/0605 370/350 |
| 2005/0123138 | A1* | 6/2005 | Abe | H04B 1/7113 380/255 |
| 2009/0110033 | A1* | 4/2009 | Shattil | H04B 1/7174 375/141 |

FOREIGN PATENT DOCUMENTS

| | | |
|---|---|---|
| JP | 2002-152191 A | 5/2002 |
| JP | 2003-224533 A | 8/2003 |

(Continued)

OTHER PUBLICATIONS

International Search Report (PCT/ISA/210) issued in PCT Application No. PCT/JP2013/078376 dated Dec. 3, 2013 with English translation (5 pages).

*Primary Examiner* — George Eng
*Assistant Examiner* — Umair Ahsan
(74) *Attorney, Agent, or Firm* — Crowell & Moring LLP

(57) ABSTRACT

A highly-secure wireless communication system has a transmitter for transmitting the same information at predetermined polarized wave angles having different rotation-polarized waves for rotating the polarized waves of a carrier wave, and a receiver for restoring the reception information at the aforementioned predetermined polarization wave angles and for comparing the restoration results of the predetermined polarization wave angles with one another.

11 Claims, 12 Drawing Sheets

(56) References Cited

FOREIGN PATENT DOCUMENTS

| JP | 2004-32679 A | 1/2004 |
|---|---|---|
| JP | 2005-130127 A | 5/2005 |
| JP | 2008-199263 A | 8/2008 |
| JP | 2013-66078 A | 4/2013 |

* cited by examiner

FIG. 3
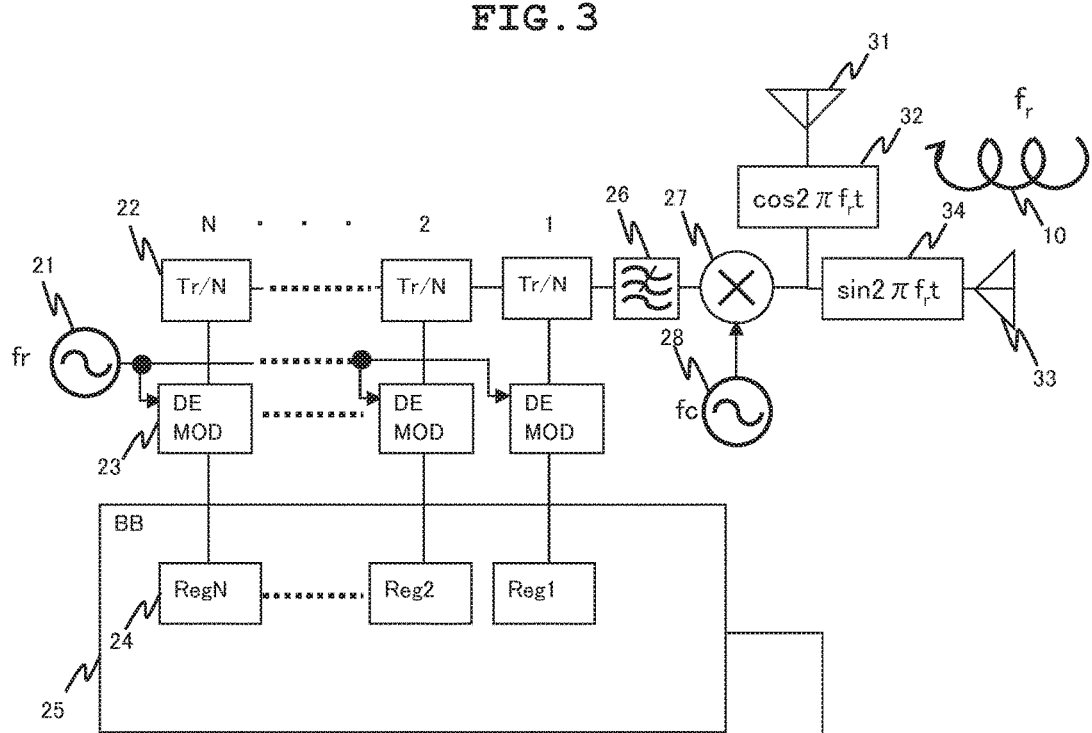
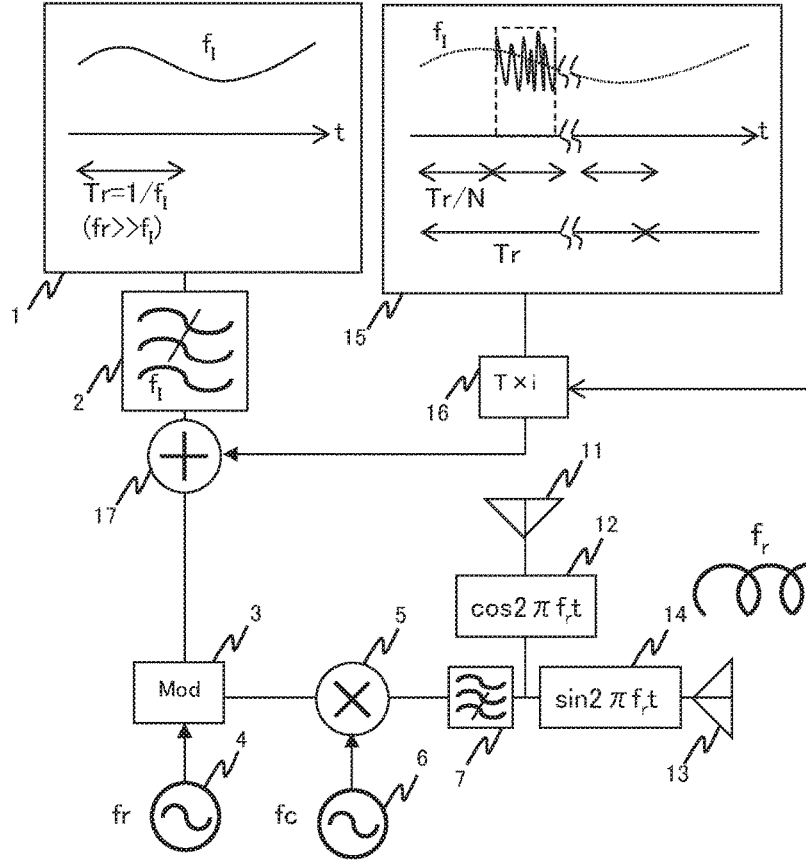

HIGHLY-SECURE WIRELESS COMMUNICATION SYSTEM

TECHNICAL FIELD

The present invention relates to provision of a wireless unit that achieves highly secure wireless communication. More particularly, the present invention is concerned with a technology for realizing a wireless communication system that can detect or eliminate concealment of information to be transmitted and external interference on the information by employing a multipath wave which is derived from obstacles, which reflect or scatter a radio wave, in an environment in which the wireless unit is placed.

BACKGROUND ART

For fostering an industry that can continuously grow, implementation of a new energy generation/distribution system that can achieve both highly efficient energy consumption and reduction of industrial wastes has been socially demanded. Construction of a new energy and communication fusing network intended to generate or distribute energy is in progress in various places in the world. The energy and communication fusing network aims to link various pieces of equipment that are engaged in generation, distribution, and consumption of energy, share pieces of information concerning the operating situations of the pieces of equipment and an ambient environment among all the pieces of equipment or specific pieces of equipment, control the operating states of the pieces of equipment, which are linked over the network, using the pieces of information, and optimize the performances, which all the pieces of equipment linked over the network should attain, as an entire system. For implementation of the network, since the number of pieces of equipment to be linked is very large, use of a wireless network is expected in order to reduce a cost of introduction of the network and a cost of maintenance of the network.

The wireless network is expected to reduce the costs of introduction and maintenance but is confronted with such issues that it is easy to intercept or alter data, which flows over the network, because of a physical nature of an electromagnetic wave serving as a communication medium for wireless communication, and that it is difficult to control the pieces of equipment using the data or sustain the security of monitoring information. In particular, if the pieces of equipment linked over the energy and communication fusing network generate or distribute a resource, which is directly connected to civilian lives, such as electric power, tap water, or gas, malicious interception or alteration of the data would give a severe blow to the civilian lives. The issue that it is difficult to control the pieces of equipment or sustain the security of monitoring information has to be resolved without fail in order to implement the energy and communication fusing network with a wireless technology.

Wireless communication is achieved along plural different paths that extend from a transmitting point to a receiving point, that is, plural multipath reflection propagation paths derived from reflections caused by pieces of equipment because the pieces of equipment existent between the transmitting point and receiving point of communication act as electromagnetic wave scattering bodies. The plural paths derived from multipath reflections are intrinsic to the transmitting point and receiving point. At any spatial point other than the transmitting and receiving points, a signal sent from the transmitting point reaches another spatial point along paths different from the paths extending from the transmitting point to the receiving point. A signal generated at any spatial point reaches the receiving point along paths different from the paths extending from the transmitting point to the receiving point. This brings about a possibility that information which cannot be obtained at any spatial point may be transferred between the transmitting and receiving points by selecting or combining plural paths extending from the transmitting point to the receiving point. As a technology employing this principle, Patent Literature 1 is cited. A frequency spectrum of a receiving signal is used as a key to encrypt information that should be transmitted, and the information is transmitted from the transmitting point. At the receiving point, the receiving signal is decrypted using the frequency spectrum. Patent Literature 2 describes that the behavior of receiving electric power which temporally fluctuates and is called a delay spread in mobile communication is used as a key to encrypt information that should be transmitted, and the information is transmitted from the transmitting point. At the receiving point, the receiving signal is decrypted using the delay spread. Further, Patent Literature 3 describes that a transmitter transmits an impulse train, an impulse response intrinsic to the receiving point is used as a key to encrypt information that should be transmitted, and the information is transmitted from the transmitting point. At the receiving point, the receiving signal is decrypted using the impulse response. Due to the reversibility of an electromagnetic wave and the symmetry of transmitting and receiving in communication, whether a signal wave on the same time base is transmitted from the transmitting point to the receiving point or from the receiving point to the transmitting point, the signal wave of the receiving signal is held unchanged. The signal wave stems from interference of an electromagnetic wave that is transmitted over plural transmission lines derived from intrinsic multipath reflections and formed between the transmitting and receiving points. Therefore, it is very difficult to acquire the signal wave at any spatial point other than the transmitting and receiving points.

CITATION LIST

Patent Literature

PTL 1: Japanese Patent Application Laid-Open No. 2008-199263
PTL 2: Japanese Patent Application Laid-Open No. 2013-066078
PTL 3: Japanese Patent Application Laid-Open No. 2005-130127

SUMMARY OF INVENTION

Technical Problem

In the aforesaid technologies, an irregular change in a signal wave on a time base of a receiving signal in mobile communication is used as a cipher key to conceal a signal that should be transmitted. In consideration of application to point-to-point communication, since the change in the signal wave is so feeble that it is difficult to make the key, which is used to conceal the signal, complex, the degree of concealment cannot be raised. The technologies will be described below. As for Patent Literature 1, since many frequencies in a wide frequency band have to be used to obtain the complex frequency spectrum through point-to-point communication, the frequency use efficiency may be degraded. As for Patent Literature 2, a temporal change in a received signal strength indicator (RSSI) is not manifested through point-to-point communication. In order to forcibly induce a signal change, plural antennas have to be used to change the radiation pattern for a transmission signal. In order to largely change the radiation pattern, the number of antennas has to be increased. This brings about an increase in the size of equipment and a rise in a cost of equipment. As for Patent Literature 3, since a pulsating wave is used as a transmission wave, many frequency components are needed to produce the pulsating wave. Similarly to Patent Literature 1, the frequency use efficient may be degraded. Further, the technologies can conceal information, which should be transmitted, through encryption, and can therefore exert an effect of preventing tapping of the signal. However, the technologies do not take account of blocking of a signal by an external intruder or alteration of the signal through "identity fraud."

An object of the present invention is to detect alteration of a signal, which is transferred between a transmitter and receiver, in an electromagnetic environment in which plural scattering bodies that scatter an electromagnetic wave exist between the transmitter and receiver, an electromagnetic wave radiated from the transmitter is reflected from the scattering bodies along multiple paths, and the reflected waves interfere with one another and reach the receiver.

Solution to Problem

A highly secure wireless communication system to be disclosed includes a transmitter that transmits one piece of information at predetermined different angles of polarization of a circularly polarized wave with which a carrier is circularly polarized, and a receiver that restores receiving information in relation to the predetermined angles of polarization and compares the results of restoration, which relate to the predetermined angles of polarization, with one another.

Advantageous Effects of Invention

According to the present invention, alteration of a signal that is transferred between a transmitter and receiver can be detected in an electromagnetic environment in which plural scattering bodies that scatter an electromagnetic wave exist between the transmitter and receiver, an electromagnetic wave radiated from the transmitter is reflected from the scattering bodies along multiple paths, and the reflected waves interfere with one another and reach the receiver.

BRIEF DESCRIPTION OF DRAWINGS

FIG. 3 is a diagram showing another example of configurations of a transmitter and receiver constituting a highly secure wireless communication system.

DESCRIPTION OF EMBODIMENTS

An example of an embodiment uses two transmitting antennas to produce a transmission wave, the direction of polarization of which is varied at a first frequency, by recomposing an information signal at sampling timings exhibiting a frequency higher than the first frequency, weighting the recomposed signal, and convoluting the weighted signal to a carrier. A receiver reconstructs the information signal using the weight according to the sampling timings.

In another example of the embodiment, the number of different sampling points within a first cycle of a transmission wave, with which an original information signal is circularly polarized at the first frequency, and plural values allocated to the respective points are rearranged during the same number of repetitive cycles as the number of sampling points. Plural values obtained during the cycles can be discriminated from one another.

In still another example of the embodiment, an information signal weighted with an arbitrary weight is transmitted from a first transmitting or receiving point to a second transmitting or receiving point. At the second transmitting or receiving point, the signal is demodulated in order to reproduce the weight. A new information signal weighted with the reproduced weight is transmitted to the first transmitting or receiving point. At the first transmitting or receiving point, the receiving signal is demodulated in order to reproduce the new information signal that is transmitted from the second transmitting or receiving point while being weighted with the weight used for the initial weighting. Thereafter, the information signal weighted with the same weight is transmitted from the first transmitting or receiving point to the second transmitting or receiving point. At the second transmitting or receiving point, the signal is demodulated in order to reproduce the information signal using the weight with which the information signal has previously been weighted. The weight obtained by demodulating the receiving signal is used to transmit the new information signal to the first transmitting or receiving point.

In still another example of the embodiment, at a first transmitting or receiving point and second transmitting or receiving point, if a weight used to weight a previous information signal to be transmitted, and a weight obtained by demodulating a receiving signal are inconsistent with each other at any of different sampling points within a first cycle, appearance of an external intruder is recognized. An information signal component associated with the sampling point at which the inconsistency occurs is discarded, and a new information signal component is transmitted. In this case, the information signal component that is associated with the sampling point at which the inconsistency occurs and is transmitted is replaced with a dummy signal that has nothing to do with monitoring or control of equipment.

Figure 2:
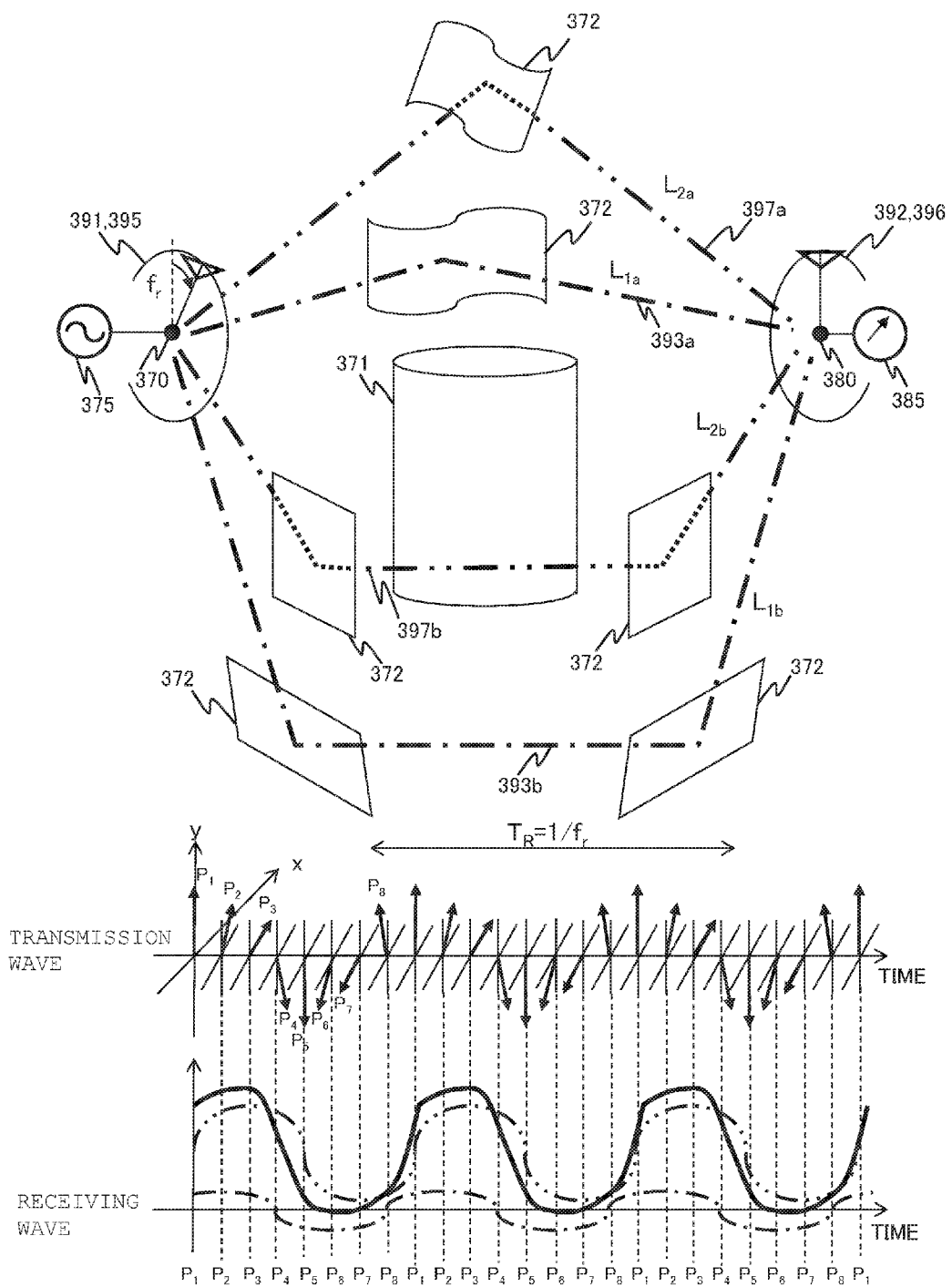
FIG. 2 is an explanatory diagram concerning the operating principle of the highly secure wireless communication system.

Referring to FIG. 2, the principles of the embodiment will be described below. A fixture 371 that is an electromagnetic wave scattering body exists between a transmitting antenna 370 included in a transmitter 375 and a receiving antenna 380 included in a receiver 385. There is no path along which an electromagnetic wave directly reaches the receiving antenna 380 from the transmitting antenna 380. An electromagnetic wave radiated from the transmitting antenna 370 is repeatedly reflected from plural electromagnetic wave reflecting objects 372 that are distributed around the transmitter 375 and receiver 385, and reaches the receiving antenna 380. A transmission wave 391 transmitted from the transmitter 375 in a first direction of polarization using the transmitting antenna 370 that varies a direction of polarization reaches the receiver 385 in a third direction of polarization as a receiving wave 392 that is a synthetic wave of a reflected wave 393a of a path length L1a and a reflected wave 393b of a path length L1b. Further, a transmission wave 395 transmitted from the transmitter 375 in a second direction of polarization according to another timing by varying the direction of polarization reaches the receiver 385 in a fourth direction of polarization as a receiving wave 396 that is a synthetic wave of a reflected wave 397a of a path length L2a and a reflected wave 397b of a path length L2b. In the example of FIG. 2, the waves 393a and 393b are canceled out by the receiving antenna 380, the polarizations of which are fixed, at points P4 and P8 because of the angles of a polarized transmission electromagnetic wave. The electric powers received by the receiving antenna 380 from the waves 397a and 397b are varied depending on the angles of the polarized transmission electromagnetic wave. However, the receiving electric powers will not be zeros irrespective of an angle of polarization. A combination of paths along which electric powers propagate to be canceled out at a receiving point is determined with a relationship between a path length and a rotational frequency of a polarized wave. Changing the combination of paths can be achieved by changing a frequency difference between carriers used to generate a circularly polarized wave.

A communication procedure will be described below. Fixed information is given to a transmitter and receiver in advance. The fixed information is used to exchange the capabilities of the transmitter and receiver, and is transmitted or received by the transmitter and receiver. The transmitter and receiver can obtain the same receiving wave shown in FIG. 2. The receiving wave is used as a key to transmit an information signal from the transmitter to the receiver by varying an angle of polarization and applying different weights in relation to different angles of polarization. The receiver stores the receiving wave, restores the weights in relation to the sampling points associated with the different angles of polarization, extracts the converted information signal from the receiving signal using the key according to the weights, and reproduces the information signal from the receiving signal demodulated using the receiving wave, which is preserved in advance, as the key. The cycle of the information signal is much longer than the rotation cycle of the polarized wave. Therefore, while the sampling points needed to reproduce the weights are obtained, a change in the information signal converted using the receiving signal wave as the key can be ignored. The cycle of the information signal has to be four times or more to one hundred times or less longer than the rotation cycle of a polarized wave in terms of the current situation of devices employed in digital signal processing for detecting an information signal independently (as for a frequency, a one tenth or more or one fourth or less). Preferably, a difference of a multiple of about ten (one digit) is needed. Therefore, the frequency of a circularly polarized wave is ten times or more higher than the upper-limit frequency of an information signal and ten times or more lower than the frequency of a carrier.

Next, the receiver uses the capability of the transmitter to convert an information signal using a newly received receiving wave as a key, uses restored weights to weight the information signal in relation to angles of polarization, and returns the information signal to the transmitter using a circularly polarized wave, and thus updates the receiving wave. For a better understanding, FIG. 2 shows only components of the transmitter and receiver that are concerned with transmitting or receiving. In reality, the transmitter 375 and receiver 380 have a transmitting or receiving capability. The transmitting antenna 370 and receiving antenna 380 can cope with fixed polarization and circular polarization. Using the communication procedure, an information signal to be transferred between transmitting and receiving points is converted using an intrinsic receiving wave, which can be obtained at the transmitting and receiving points alone, as a key, and radiated to a free space. This exerts an effect of concealing the information signal from an outsider who exists at another spatial point at which the intrinsic receiving wave cannot be acquired. Assume that the same information signal is transmitted in directions of polarization Pi with different weights. If an external intruder exists on a path 393a or 393b and alters a signal on the path, an effect of alteration on a receiving signal is not obtained at sampling points associated with angles of polarization P4 and P8. When the capabilities of the transmitter 375 and receiver 385 are exchanged and alternately perform communication, if the same information is transferred over one reciprocation, the fact that the external intruder has altered the signal at the sampling points associated with the angles of polarization P4 and P8 can be recognized, and the external intruder can be detected. After the external intruder is detected, the altered signal can be repaired by discarding data items received at the sampling points associated with the angles of polarization P4 and P8. Further, the data item sent from the sampling points are replaced with dummy data items, whereby the external intruder can be provided with intentionally ineffective information.

Examples will be described below in conjunction with the drawings.

Example 1

Figure 1:
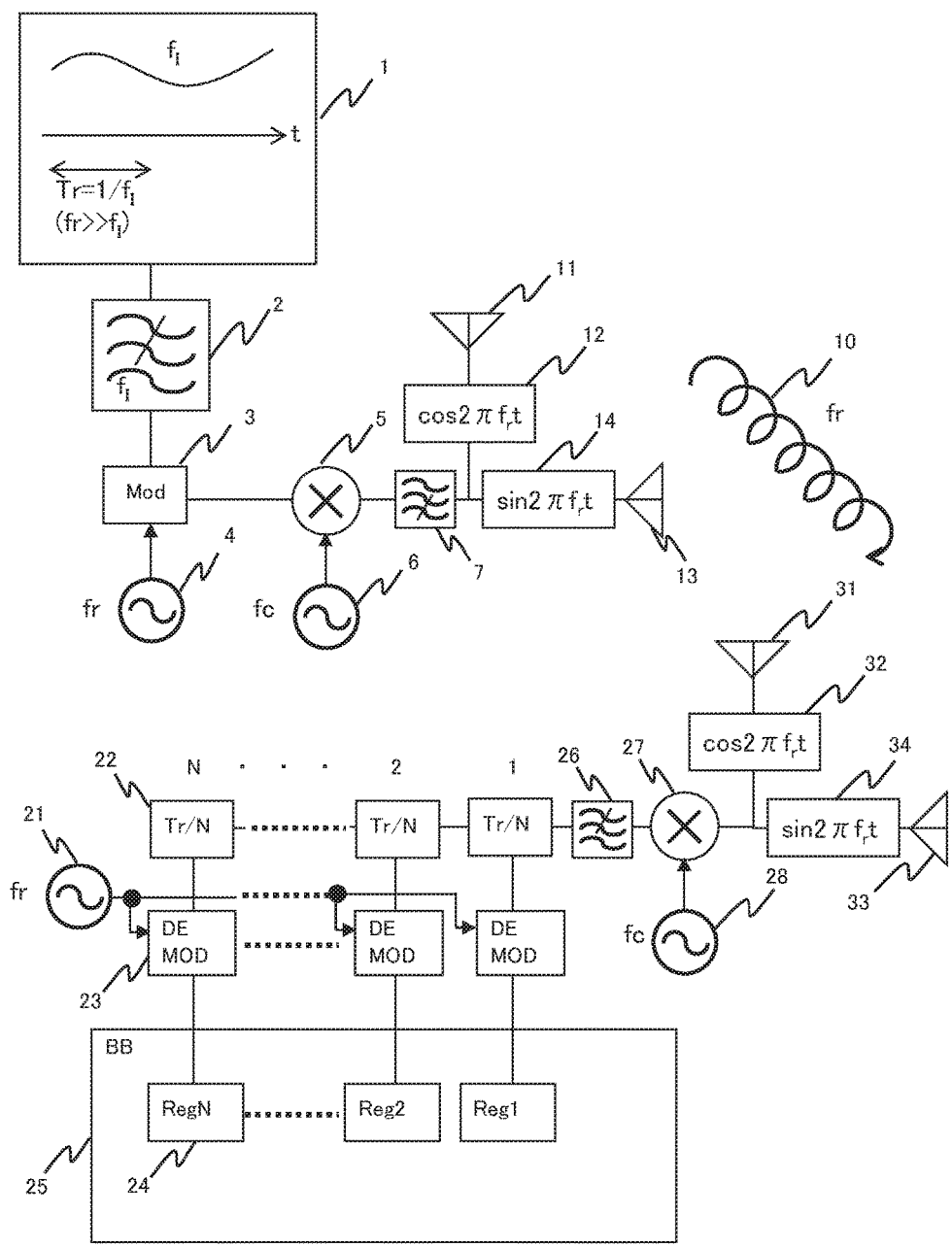
FIG. 1 is a diagram showing an example of configurations of a transmitter and receiver constituting a highly secure wireless communication system.

FIG. 1 is a diagram showing an example of configurations of a transmitter and receiver constituting a wireless system of the present example. In the transmitter, a band limiting filter 2 determines the upper limit of frequencies contained in a signal that falls within a frequency band (f1) and is produced by an information signal production circuit 1. A modulation circuit 3 convolutes a circularly polarized wave frequency carrier (fr) 4 to the signal. A harmonic mixer 5 convolutes a transmission carrier frequency carrier (fc) 6 to the signal. A spurious removing filter 7 removes an unnecessary harmonic component from the signal. A cosine weighting circuit 12 controls the amplitude of the signal. The signal is then radiated from a transmitting vertical antenna 11. At the same time, the signal whose amplitude is controlled by a sine weighting circuit 14 is radiated to the space from a transmitting horizontal antenna 13. Thus, a circularly polarized electromagnetic wave 10 that propagates while varying the angle of polarization is formed. The cosine weighting circuit 12 and sine weighting circuit 14 weight the amplitudes of signals, which are radiated from the vertical antenna 11 and horizontal antenna 13 respectively, at the same frequency as that of the transmission circularly polarized frequency carrier (fr) 4 so that the signals have a phase difference of 90°. Therefore, the rotational frequency of a circularly polarized electromagnetic wave is identical to that of the rotational frequency carrier (fr) 4.

The receiver includes a receiving vertical antenna 31 that radiates a signal whose amplitude is controlled by a cosine weighting circuit 32, and a receiving horizontal antenna 33 that radiates a signal whose amplitude is controlled by a sine weighting circuit 34. Signals inputted through the antennas are added up, and convoluted to a receiving carrier frequency carrier (fc) 28 by a harmonic mixer 27. The resultant signal is passed through a low pass filer 26 and a retarder 22 that cascades a frequency component of a circularly polarized wave and a frequency component of an information signal. An integral number of signal components is multiplied by a receiving circularly polarized wave frequency carrier (fr) 21 by a demodulator 23 while being provided with a phase different that is equivalent to a quotient obtained by dividing the cycle of the circularly polarized wave by an integer. The integral number of signal components is then stored in an integral number of registers 24.

The vertical antenna 11 and horizontal antenna 13 of the transmitter are formed with two linear polarization antennas that are spatially orthogonal to each other. Likewise, the vertical antenna 31 and horizontal antenna 33 of the receiver are formed with two linear polarization antennas that are spatial orthogonal to each other.

The frequency of an information signal produced by the information signal generation circuit 1 is much lower than the frequency of a circularly polarized wave, and is therefore thought to remain constant during the cycle of the circularly polarized wave. Data items stored in the respective registers 24 are held intact unless the circularly polarized electromagnetic wave 10 is intentionally and externally altered in the course of propagation from the transmitter to receiver. A baseband circuit 25 compares the contents of the registers 24 with one another to check if the contents are identical to one another. If the contents of any of the registers are different from those of the others, presence of externally intentional alteration is recognized. By discarding the contents of the register which are different from the contents of the other registers, an information signal sent from a transmission unit can be isolated from an adverse effect of an externally intentional alteration activity.

According to the present example, not only presence of an externally intentional alteration activity can be detected but also alteration of an information signal, which should be transmitted, by the alteration activity can be inhibited. This exerts an effect of achieving highly secure transmission of the information signal.

Example 2

FIG. 3 is a diagram showing another example of configurations of a transmitter and receiver constituting the wireless communication system of the present example. A difference from the example shown in FIG. 1 is that the receiver further includes a dummy signal generation circuit 15. The dummy signal generation circuit 15 generates a dummy signal that has nothing to do with an information signal, which should be sent from the transmitter, during a period equivalent to a value (Tr/N) obtained by dividing the cycle (Tr) of a circularly polarized wave by an integer. In the present example, an adaptive phase shifter (Txi) 16 and adder 17 are newly included. The adaptive phase shifter (TXi) 16 is adjusted so that the dummy signal generated by the dummy signal generation circuit 15 can be transmitted at an angle of polarization equivalent to a period during which an externally intentional alteration activity detected by the baseband circuit 25 takes place. The angle of polarization of an electromagnetic wave to be radiated from the transmitting antennas 11 and 13 during transmission is not always consistent with the angle of polarization of a receiving electromagnetic wave relating to presence of the externally intentional alteration activity detected by the receiver at the same time. When information is transmitted by dividing the cycle (Tr) of a circularly polarized wave, the angle of polarization at the time when the electromagnetic wave is radiated from the transmitter can be identified by convoluting different codes in relation to the divisions of the cycle.

According to the present example, not only an adverse effect of an externally intentional alteration activity on a receiving signal can be eliminated but also data that may persuade a person, who is concerned with the alteration activity, to keep from transmitting data devoid of information or to keep from performing the alteration activity can be transmitted. This exerts an effect of generating a force of inhibiting the externally intentional alteration activity.

Example 3

Figure 4:
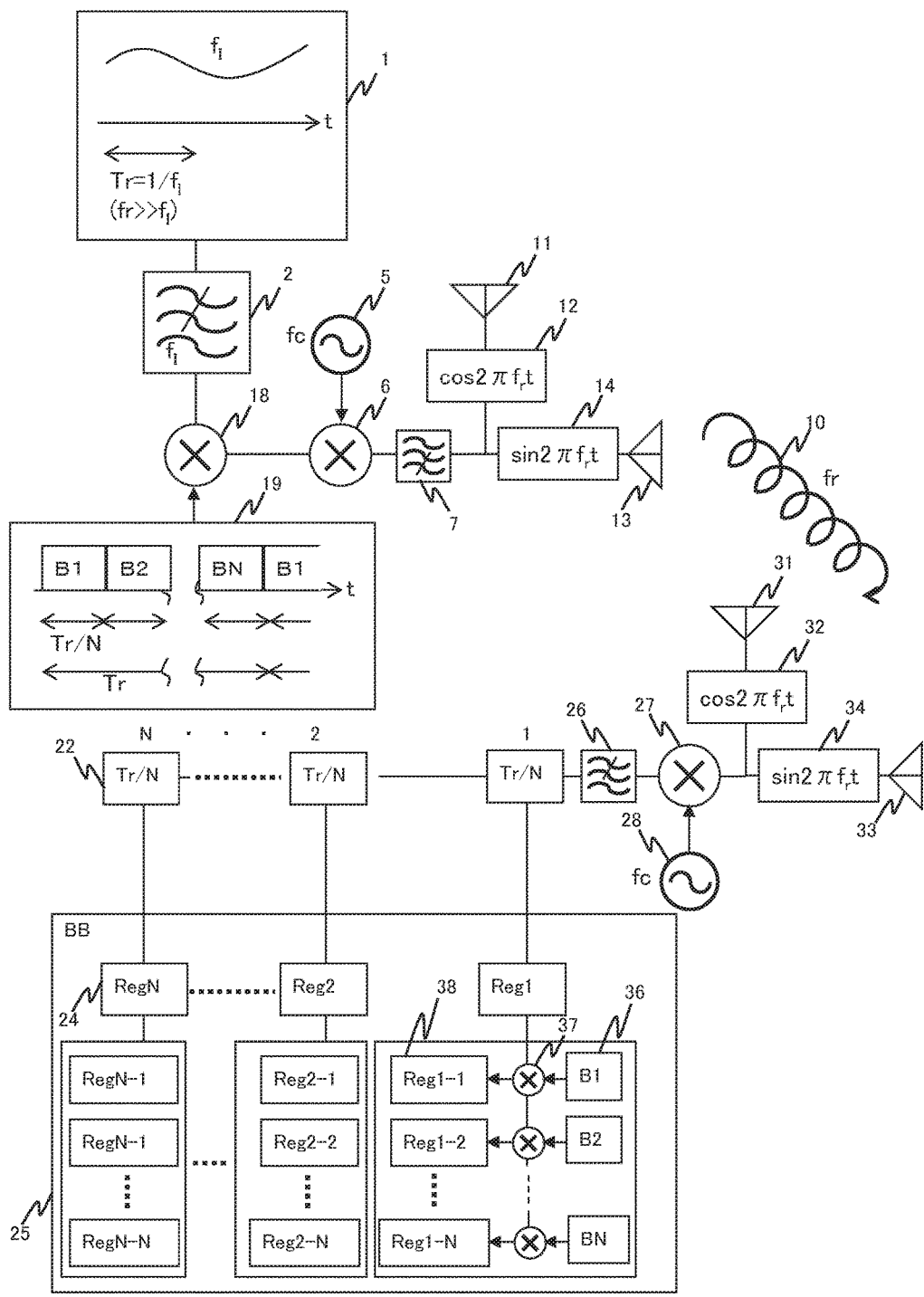
FIG. 4 is a diagram showing still another example of configurations of a transmitter and receiver constituting a highly secure wireless communication system.

FIG. 4 is a diagram showing another example of configurations of a transmitter and receiver constituting a wireless system of the present example. A difference from the transmitter in the example shown in FIG. 1 is that a block code production circuit 19 that produces a different block code during each of division periods into which the cycle of a rotational frequency is divided by an integer is substituted for the circularly polarized wave frequency carrier (fr) 4, and a multiplier 18 is substituted for the modulation circuit 3 in order to convolute the block codes, which are produced by the block code production circuit 19, to an information signal. A difference from the receiver in the example shown in FIG. 1 is that an integral number of signal components is stored in the respective registers 24 as they are via the retarder 22, which cascades a frequency component of the circularly polarized wave and a frequency component of the information signal, while being provided with a phase difference equivalent to a quotient obtained by dividing the cycle of a circularly polarized wave by an integer. The contents of each of the registers 24 are multiplied by any of different block codes, which are produced by the block code production circuit 19, by the multiplier 37, and the contents of the registers are then stored in second registers 38.

According to the present example, by checking the contents of the second registers 38, signal components relating to angles of polarization of a received electromagnetic wave can be associated with angles of polarization of an electromagnetic wave radiated from the transmitter using the block codes. The effect of Example 2 can be exerted. That is, data devoid of information or data that may deter an alteration activity can be transmitted to a person concerned with the externally intentional alteration activity.

Example 4

Figure 5:
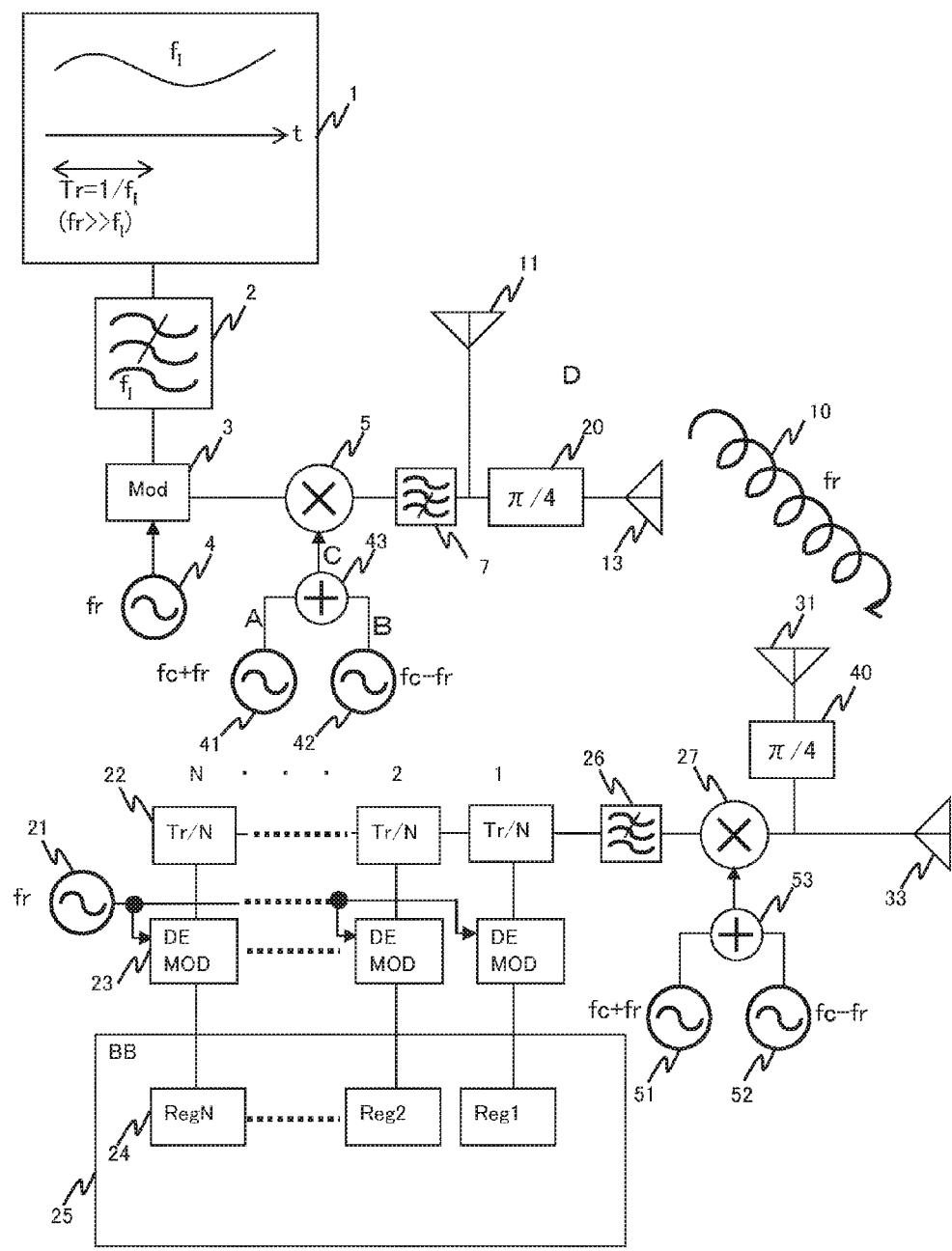
FIG. 5 is a diagram showing still another example of configurations of a transmitter and receiver constituting a highly secure wireless communication system.
Figure 6:
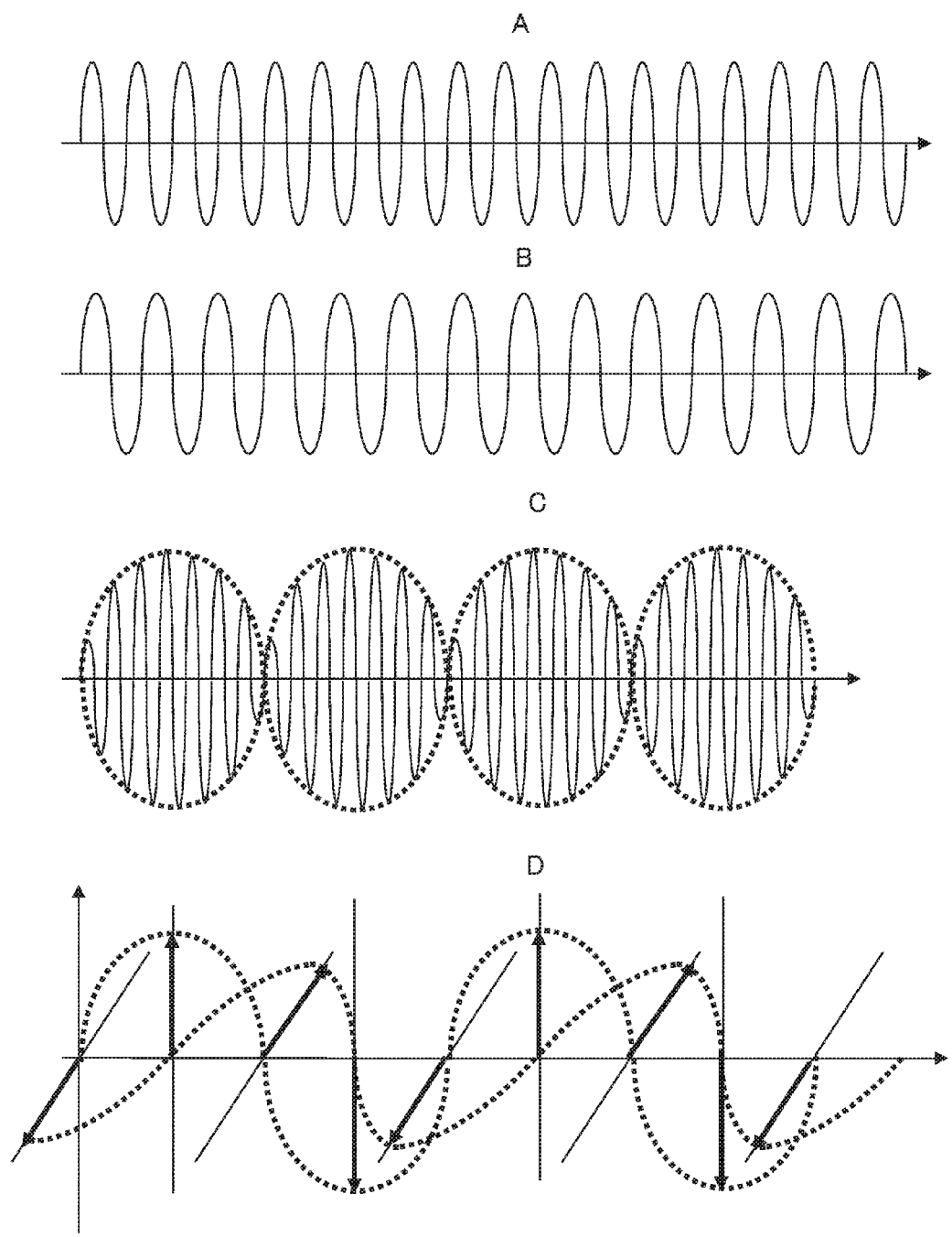
FIG. 6 is a diagram showing the principles of production under which a circularly polarized wave is produced by a transmitter included in a highly secure wireless communication system.

FIG. 5 is a diagram showing another example of configurations of a transmitter and receiver constituting a wireless system of the present example. A difference from the transmitter in the example shown in FIG. 1 is that the cosine weighting circuits 12 and 32 and the sine weighting circuits 14 and 34 are excluded, 90° phase shifters 20 and 40 are connected to the transmitting horizontal antenna 13 and receiving vertical antenna 39 respectively, a synthetic signal of a transmission first carrier (fc+fr) 41 and transmission second carrier (fc−fr) 42 produced by the adder 43 and a synthetic signal of a receiving first carrier (fc+Fr) 51 and receiving second carrier (fc−fr) 52 produced by the adder 53 are employed in place of the transmission carrier 6 and receiving carrier 28. The frequencies of the first carrier and second carrier are different from each other. When the first carrier and second carrier are added up, a beat wave is produced at a frequency that is a difference between the frequencies of the carriers. The beat wave is spatially and temporally dephased by 90° and then spatially synthesized, whereby a circularly polarized electromagnetic wave can be produced. FIG. 6 shows temporal waves sent from the transmitter of the present example at points. The wave A of the transmission first carrier and the wave B of the transmission second carrier are synthesized by the adder 43, whereby a wave C is produced. The wave C is spatially shifted by 90° and synthesized in spatially orthogonal directions, whereby a circularly polarized wave like a wave D is formed.

According to the present example, the cosine weighting circuit and sine weighting circuit that are needed to be mutually controlled can be excluded. This is effective in decreasing the sizes of the transmitter and receiver respectively and reducing a cost of manufacture.

Example 5

Figure 7:
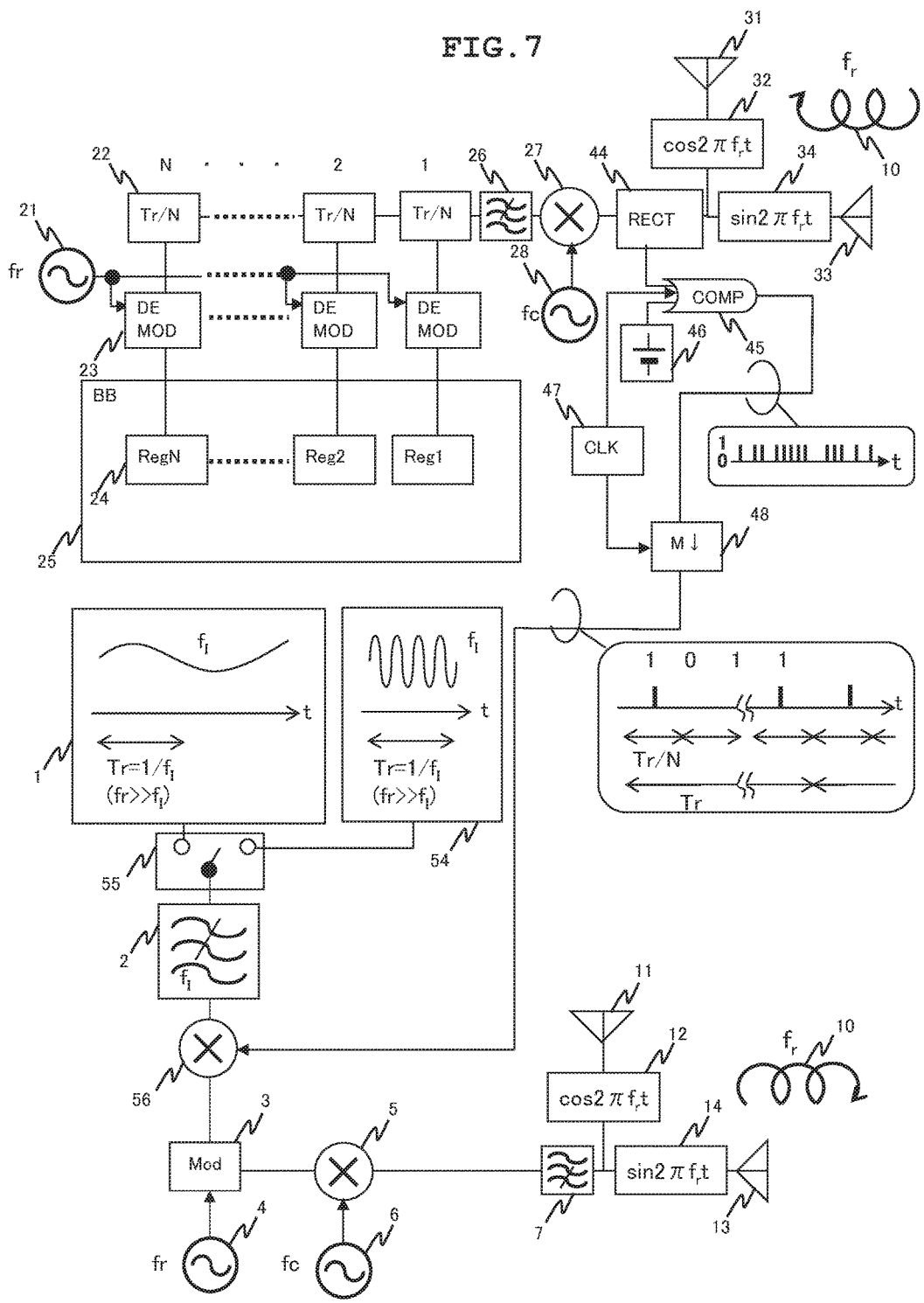
FIG. 7 is a diagram showing still another example of configurations of a transmitter and receiver constituting a highly secure wireless communication system.

FIG. 7 is a diagram showing still another example of configurations of a transmitter and receiver constituting a wireless system of the present example. A difference from the transmitter in the example shown in FIG. 1 is that a detection circuit 44 is newly inserted at a common input point of the cosine weighting circuit 32 and sine weighting circuit 34, and an output of the detection circuit 44 is compared with a comparative voltage of a comparative level generator 46 by a comparator 45, thinned by a time base signal thinning circuit 48, and convoluted to a signal, which has its frequency band limited by the band limiting filter 2, by a newly introduced multiplier 56. A clock is fed to the comparator 45 and time base signal thinning circuit 48 by a clock generation circuit 47. The comparing timing and thinning timing are finalized using the clock. Further, a stereotyped information generation circuit 54 is newly included in the transmitter, and an output of the stereotyped information generation circuit is selected together with an output of the information signal generation circuit 1 by a switch 55. A change on a time base in a receiving signal is detected by the detection circuit 44, and converted into a signal of 1s and 0s at a sampling frequency of the clock generation circuit 47 by the comparator 45. The resultant signal of 1s and 0s is converted into a bit string, which requires a resolution on a time base that is on a level with, several times higher, or several tens of times higher than the cycle of a circularly polarized wave, by the time-base signal thinning circuit 48. By convoluting the bit string to an information signal, the information signal can be concealed. For reproduction of the information, the bit string of 1s and 0s with which the information signal is concealed has to be shared at both a transmitting point and receiving point. When the transmitter and receiver that are identical to each other are employed at the respective points, since envelope information on an electromagnetic wave employed in communication remains unchanged due to the relativity of transmitting and receiving, the bit strings of 1s and 0s obtained by the transmitter and receiver at the respective points become identical to each other. The transmitted information signal can therefore be restored. At any point other than the transmitting point and receiving point, the same receiving envelope cannot be generally obtained. Therefore, the information signal cannot be restored at any other point. Eventually, an effect of concealment of communication can be exerted.

In the present example, the stereotyped signal generation circuit 54 is used to share the same stereotyped information at both the transmitting point and receiving point. Using the stereotyped information, information having nothing to do with the contents of information that should be transmitted, for example, information concerning a communications protocol such as Communication Initiated or Communication Terminated can be exchanged between the transmitting and receiving points. Therefore, a procedure of encrypted communication of an information signal according to the present example can be simplified. Eventually, power consumption by the transmitter and receiver and a cost of software can be reduced.

Example 6

Figure 8:
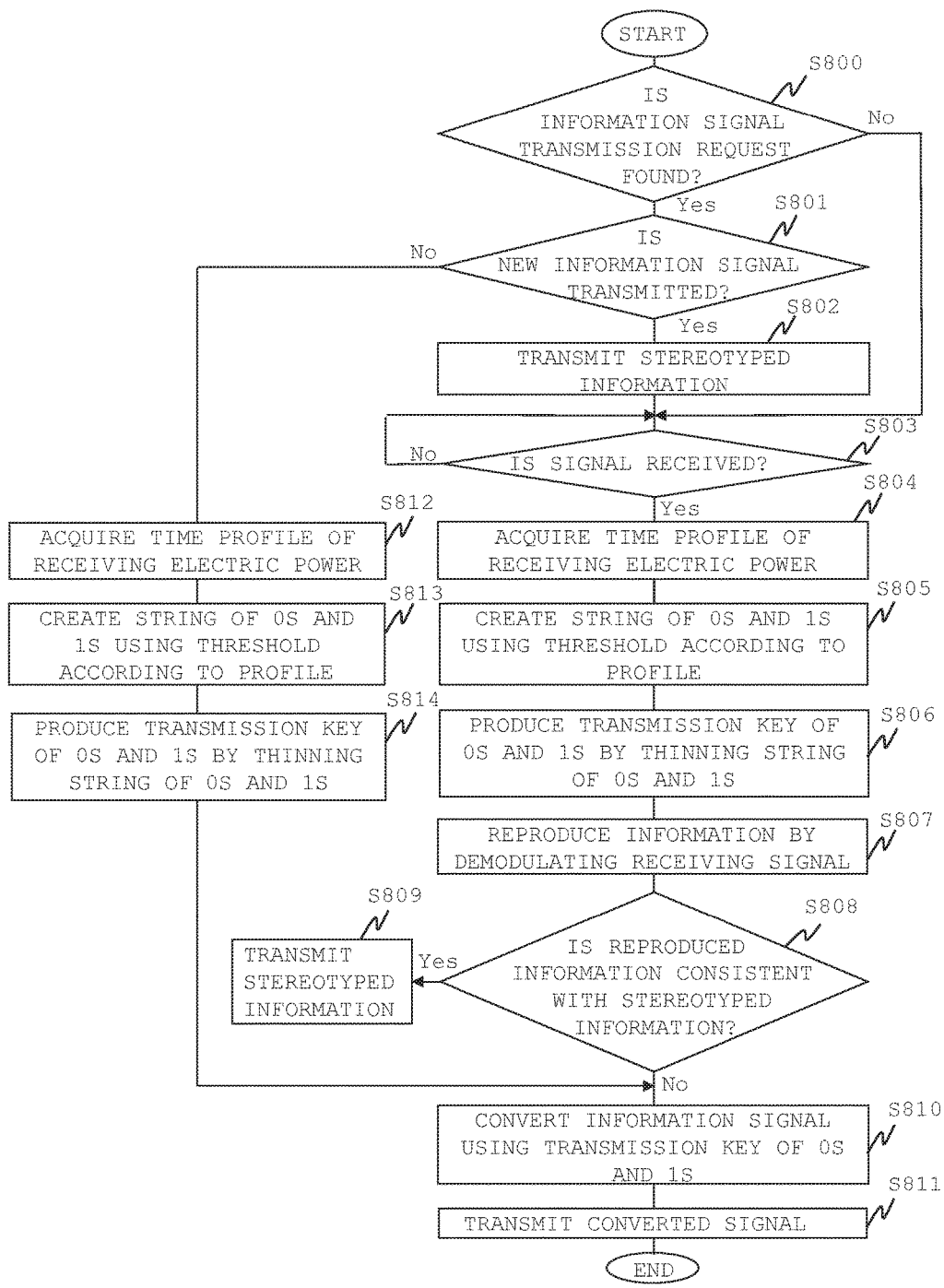
FIG. 8 is a diagram showing an example of an operating algorithm for a transmitter and receiver constituting a highly secure wireless communication system.

FIG. 8 is a diagram showing an example of a communications protocol for a transmitter and receiver constituting a wireless system of Example 5. The transmitter and receiver shall be integrated into one body as a wireless unit. The wireless unit checks a transmission request for an information signal (S800 and S801). If the transmission request is found, stereotyped information is first transmitted (S802). The wireless unit always checks presence or absence of a signal that should be received (S803). If a receiving signal is obtained (S804 to S806), the contents of the signal are demodulated (S807) in order to decide whether the signal is a stereotyped signal (S808). If the stereotyped signal is recognized, the stereotyped signal is transmitted without fail (S809). If the stereotyped signal is received immediately after being transmitted, it means that a situation in which a transmitting point and receiving point communicate with each other has been recognized. The transmitter then conceals the information signal using a key produced based on envelope information of the receiving signal (S810), and then transmits the information signal (S811). According to the protocol, the receiver produces the key using the envelope information of the receiving signal, and restores the information signal that is concealed and contained in the receiving signal.

According to the present example, steps needed to transmit an information signal between transmitting and receiving points using a stereotyped signal, that is, a step of finalizing the transmitting timing of an information signal and a step of acquiring a cipher key for use in concealing the information signal can be achieved concurrently. This actually enables highly secure transmission of the information signal.

Example 7

Figure 9:
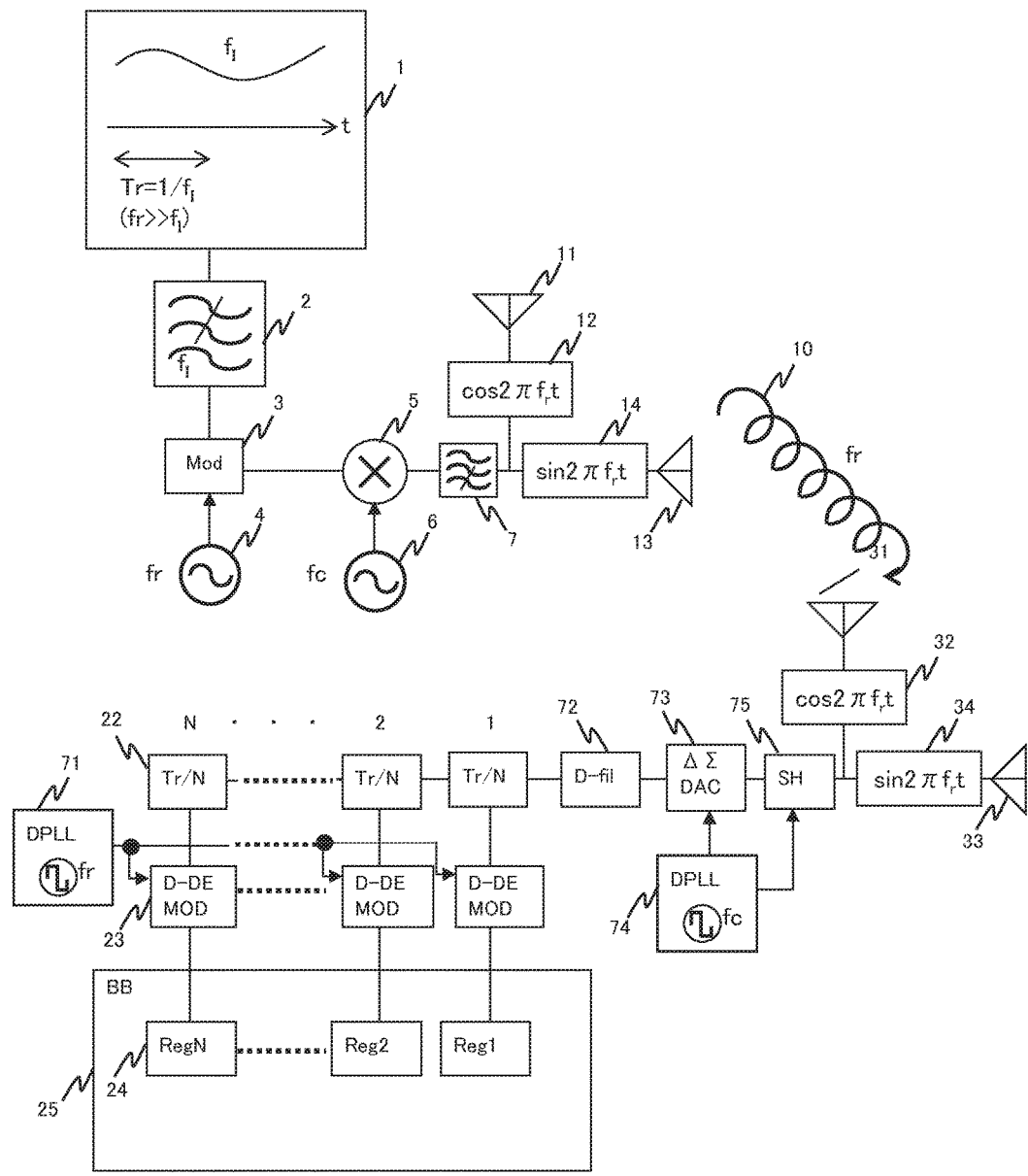
FIG. 9 is a diagram showing still another example of configurations of a transmitter and receiver constituting a highly secure wireless communication system.

FIG. 9 is a diagram showing still another example of configurations of a transmitter and receiver constituting a wireless system of the present example. A difference from the receiver in the example shown in FIG. 1 is that a receiving circularly polarized wave carrier digital signal generation circuit 71 is substituted for the receiving circularly polarized wave carrier generation circuit 21, and a receiving ΔΣ digital-to-analog converter (DAC) 73, receiving carrier frequency carrier digital signal generation circuit 74, receiving digital filter 72, and receiving sample-and-hold circuit 75 are substituted for the harmonic mixer 27, receiving carrier frequency carrier 28, and low-pass filter 26. The receiving circularly polarized wave carrier digital signal generation circuit 71 can produce a receiving circularly polarized wave carrier using a digital circuit. A receiving high-frequency signal resulting from addition performed by the cosine weighting circuit 32 and sine weighting circuit 34 is converted into a continuous digital wave by the sample-and-hold circuit 75, is digitally converted to a signal, which has a lower frequency, by the receiving ΔΣ DAC 73 using a clock generated by the receiving carrier frequency carrier digital signal generation circuit 74, and has an unnecessary alias signal, which arises collaterally, removed by the receiving digital filter 72. Thus, the signal is converted to a signal falling within the frequency band of a circularly polarized wave.

According to the present example, a receiver to be adapted to a wireless system can be realized with a digital circuit. Therefore, an autonomous adjustment feature that copes with a temperature change or time-sequential change of the receiver can be introduced. Eventually, the reliability of the receiver can be upgraded.

Example 8

Figure 10:
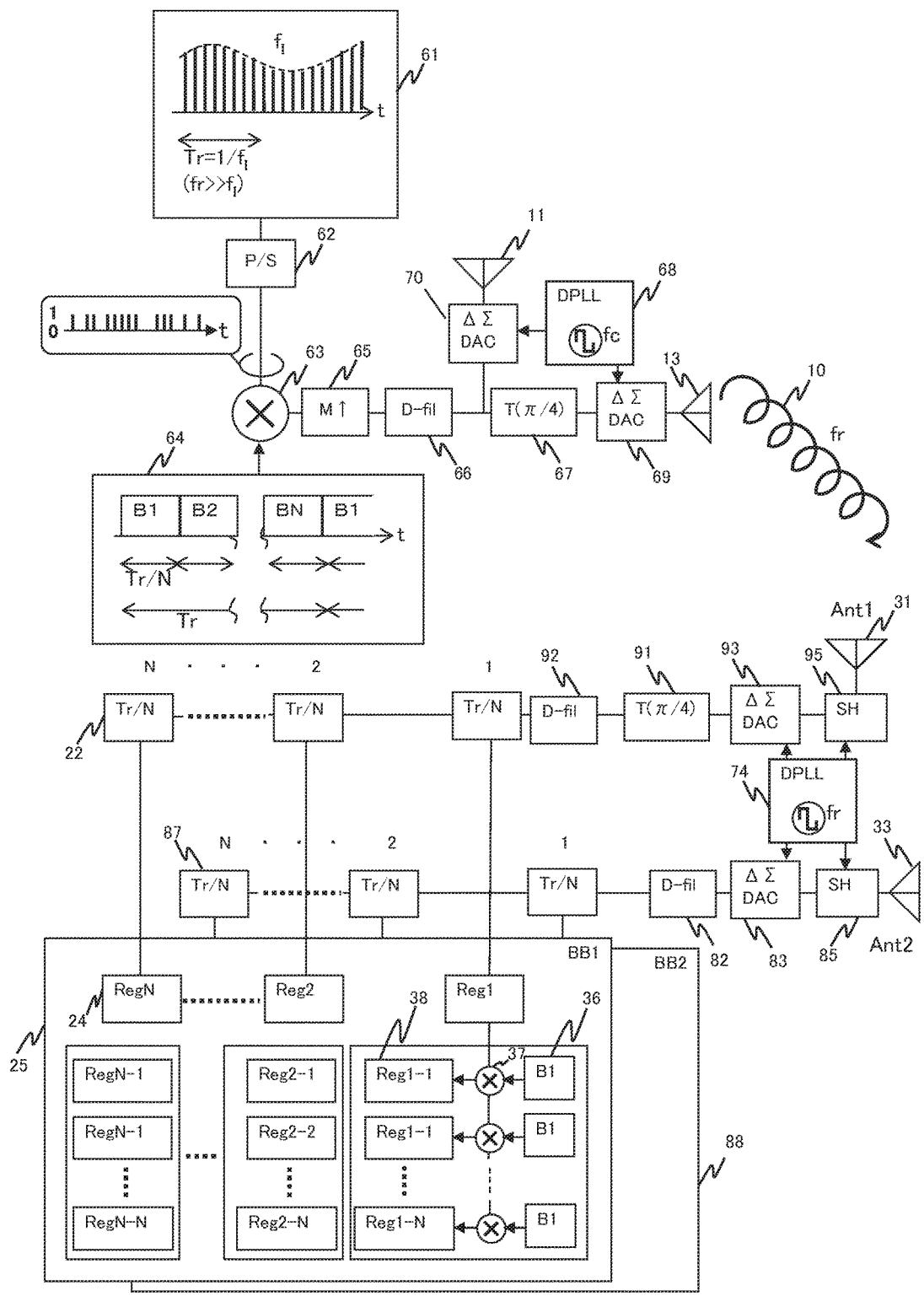
FIG. 10 is a diagram showing still another example of configurations of a transmitter included in a highly secure wireless communication system.

FIG. 10 is a diagram showing still another example of configurations of a transmitter and receiver constituting a wireless system of the present example. The transmitter uses a parallel-to-serial conversion circuit 62 to convert a digital signal, which is produced by a digital information signal production circuit 61 and falls within a frequency band f1, into a bit string of 1s and 0s, and includes a block code production circuit 64 that produces a different block code during each of division periods into which the cycle of a rotational frequency is divided by an integer. A multiplier 63 convolutes the block codes, which are produced by the block code production circuit 64, to a digital information signal that has been converted into the bit string of 1s and 0s. An up-sampler 65 raises the frequency of the digital information signal. A signal generated by a transmission carrier frequency carrier digital signal generation circuit 68 is used as a clock. A first transmission ΔΣ DAC 70 converts the frequency of the signal into a frequency falling within a carrier frequency region. The resultant signal is radiated to the space from the transmitting vertical antenna 11. At the same time, using the same clock, a second transmission ΔΣ DAC 69 converts the frequency of the digital information signal, which is passed through a circularly polarized frequency 90° phase shifter 67, into a frequency falling with the carrier frequency region. The resultant signal is radiated to the space from the transmitting horizontal antenna 13. In the receiver, a receiving electric power of the receiving vertical antenna 31 is converted into a continuous digital wave by a sample-and-hold circuit 95. Using a signal generated by a receiving carrier frequency carrier digital signal generation circuit 74 as a clock, a receiving ΔΣ DAC 93 digitally converts the frequency of the wave into a lower frequency. The wave is passed through a circularly polarized wave frequency 90° phase shifter 92. A receiving digital filter 92 removes an unnecessary alias signal that is generated collaterally, and converts the wave into a signal falling with a frequency band of a circularly polarized wave. A retarder 22 cascades the frequency component of the circularly polarized wave and a frequency component of an information signal. An integral number of signal components having a phase difference, which corresponds to a quotient obtained by dividing the cycle of the circularly polarized wave by an integer, between adjoining ones is stored in plural registers 24 as it is. The contents of each of the registers 24 are multiplied by each of different block codes, which are produced by the block code production circuit 19, by the multiplier 37. The contents are stored in second registers 38, and employed in digital signal processing by a baseband circuit 25. Receiving electric power of the receiving horizontal antenna 33 is converted into a continuous digital wave by a sample-and-hold circuit 85. Using a signal generated by a receiving carrier frequency carrier digital signal generation circuit 74 as a clock, a receiving ΔΣ DAC 83 digitally converts the frequency of the wave into a lower frequency. A receiving digital filter 82 removes an unnecessary alias signal that is collaterally generated, and converts the resultant signal into a signal falling within the frequency band of a circularly polarized wave. A retarder 87 cascades the frequency component of the circularly polarized wave and a frequency component of an information signal. Processing similar to that performed on a signal received by the receiving vertical antenna is performed on the signal, and the signal is employed in digital signal processing by a second baseband circuit 88.

According to the present example, the effect of the example shown in FIG. 4 can be exerted by a digital circuit. In addition to the effect provided by the example shown in FIG. 4, an autonomous adjustment feature against a temperature change or time-sequential change of a receiver can be introduced. Eventually, the reliability of the receiver can be upgraded.

Example 9

Figure 11:
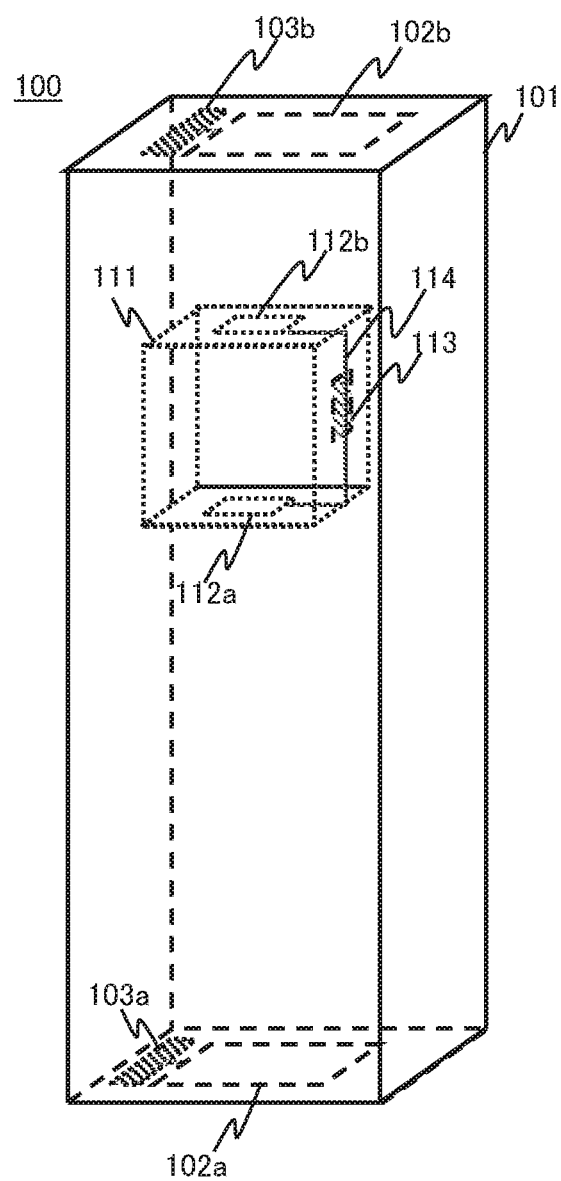
FIG. 11 is a diagram showing an example of a configuration of an elevator system to which a highly secure wireless communication system is adapted.

FIG. 11 is a diagram showing an example of a configuration of an elevator system to which an angle-of-polarization division diversity wireless unit of the present example is adapted. In the elevator system 100 of the present example, a car 111 rises or falls within a building 101 in which an elevator is installed. On the floor and ceiling of the inside of the building 101, a base station wireless unit 102 and base station two-orthogonal polarizations integrated antenna 103 which have an angle-of-polarization division diversity feature are disposed to be connected to each other. On each of the external ceiling and external floor of the elevator 11, a terminal station two-orthogonal polarizations integrated antenna 10 is disposed, and connected to a terminal wireless unit 112 over a high-frequency cable 114. The base station wireless unit 103 and terminal station wireless unit 113 use the inside of the building 101 as a wireless transmission medium. An electromagnetic wave is reflected along multiple paths from the internal walls of the building 101 and the external walls of the elevator. Thus, a multi-wave interference environment is formed.

In the present example, high-quality wireless transmission can be achieved even in a multi-wave interference environment owing to angle-of-polarization division diversity. Using wireless communication that employs the wireless units, control and monitoring of the elevator 111 can be remotely achieved away from the building 101 without use of wired communication. Facilities needed for wired communication such as cables can be eliminated. The same transportation ability can be realized with a smaller building volume. Otherwise, despite the same building volume, the transportation ability can be updated by increasing the dimension of an elevator.

Example 10

Figure 12:
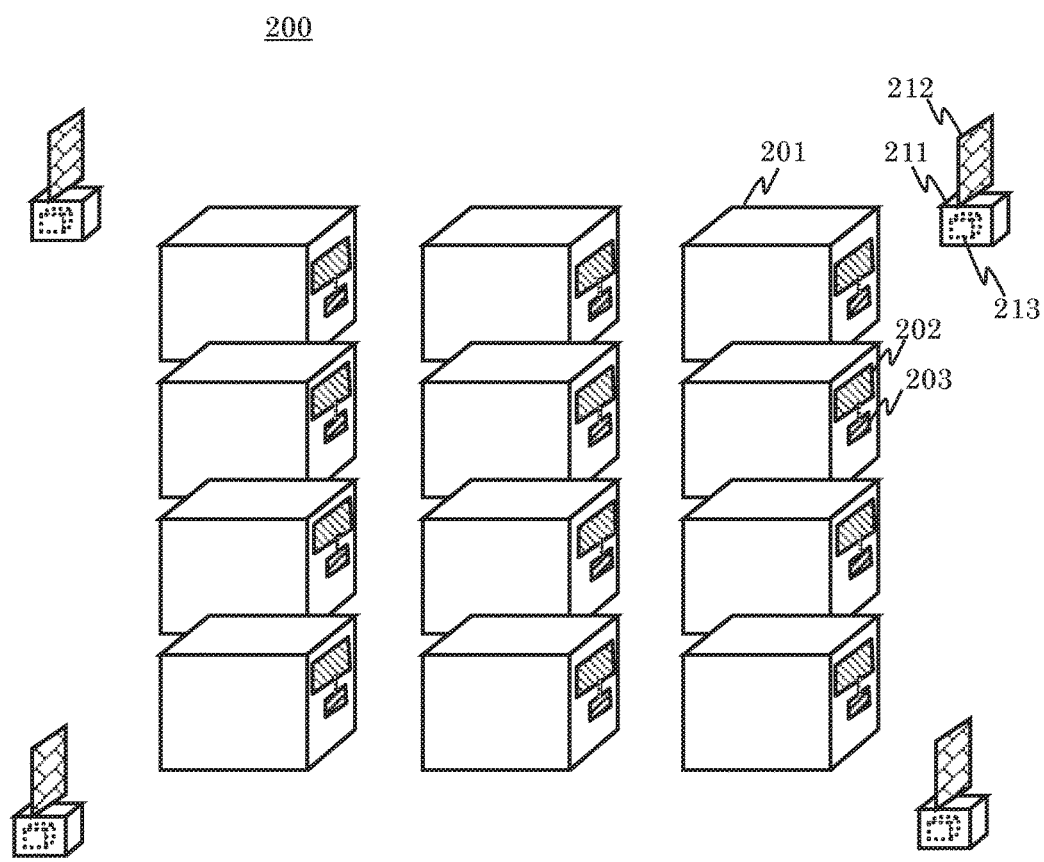
FIG. 12 is a diagram showing an example of a configuration of a transforming facility monitoring system to which a highly secure wireless communication system is adapted.

FIG. 12 is a diagram showing an example of a configuration of a transforming facility monitoring system to which an angle-of-polarization division diversity wireless unit of the present example is adapted. A transforming facility monitoring system 200 of the present example includes plural transforming apparatuses 201. A terminal station wireless unit 203 and a terminal station two-orthogonal polarizations integrated antenna 202 which accomplish angle-of-polarization division diversity are disposed on each of the transforming apparatuses 201 and connected to each other. Plural pieces of base station equipment 211 are installed in the vicinity of the plural transforming apparatuses 201. The number of pieces of base station equipment 211 is smaller than the number of transforming apparatuses 201. A base station wireless unit 213 and base station two-orthogonal polarizations integrated antenna 212 which accomplish angle-of-polarization diversity are disposed on each of the pieces of base station equipment 211 and connected to each other. The dimension of the transforming apparatus is on the order of several meters, and is outstandingly larger than a wavelength associated with a frequency of an electromagnetic wave employed by wireless units, that is, any of several hundreds of megahertz to several gigahertz. Therefore, an electromagnetic wave is reflected from the plural transforming apparatuses 201 along multiple paths, and a multi-wave interference environment is formed.

In the present example, owing to angle-of-polarization division diversity, high-quality wireless transmission can be achieved even in a multi-wave interference environment. Using wireless connection means that employs the wireless units, control and monitoring of the transforming apparatuses 201 can be remotely achieved at the plural wireless base stations 211 without use of wired connection means. An issue of high-voltage induced power occurring when the wired connection means such as cables is employed can be resolved, and a cost of laying the cables can be eliminated. Accordingly, the safety of a control and monitoring system for the transforming apparatuses 201 can be upgraded and a cost can be reduced.

According to the aforesaid embodiments, in a radio wave environment in which plural scattering bodies that scatter an electromagnetic wave exist between a transmitter and receiver, an electromagnetic wave radiated from the transmitter is reflected from the scattering bodies along multiple paths, and the reflected waves interfere with one another and reach the receiver, the electromagnetic wave is circularly polarized in order to vary receiving electric power on a time base at a receiving point, an intrinsic receiving wave representing the variation is used as a key to convert an information signal that should be transmitted, and the information signal is thus transmitted from a transmitting point to the receiving point. Accordingly, the information signal can be concealed from an outsider who exists at any spatial point other than the transmitting and receiving points at which the intrinsic receiving wave cannot be acquired. Owing to a circularly polarized transmission electromagnetic wave, a signal component acquired at a specific part of plural propagation paths extending from the transmitter to the receiver is invalidated at the receiving point by discarding the signal component at a sampling point associated with a specific angle of polarization. Signals weighted by the same value are transmitted or received between a pair of a transmitter and receiver during a rotational cycle of the circularly polarized wave. A transmission signal and receiving signal are checked to see if their signal components are inconsistent with each other at any of sampling points. Thus, existence of an external intruder can be detected. If the signal components are inconsistent with each other at any sampling point, receiving data at the sampling point is discarded. Thus, an adverse effect of information alteration by the external intruder can be eliminated.

According to the embodiments, in a radio-wave environment in which plural scattering bodies that scatter an electromagnetic wave exist between a transmitter and receiver, an electromagnetic wave radiated from the transmitter is reflected from the scattering bodies along multiple paths, and the reflected waves interfere with one another and reach the receiver, tapping of a signal transferred between transmitting and receiving points can be prevented, alteration of a transmission signal by an external intruder existing at a point other than the transmitting and receiving points can be detected, and the altered signal can be removed.

REFERENCE SINGS LIST

1: information signal production circuit,
2: band limiting filter,
3: modulation circuit,
4: transmission carrier frequency carrier generation circuit,
5: mixer,
6: transmission circularly polarized wave frequency carrier generation circuit,
7: spurious removing filter,
10: circularly polarized electromagnetic wave,
11: transmitting vertical antenna,
12: cosine weighting circuit,
13: transmitting horizontal antenna,
14: sine weighting circuit,
15: dummy signal generation circuit,
16: adaptive phase shifter,
17: multiplier,
18: multiplier,
19: block code production circuit,
20: 90° phase shifter,
21: receiving carrier frequency carrier generation circuit,
22: phase shifter,
23: demodulation circuit,
24: register,
25: digital circuit,
26: low-pass filter,
27: high-frequency mixer,
28: receiving circularly polarized wave frequency carrier generation circuit,
31: receiving vertical antenna,
32: cosine weighting circuit,
33: receiving horizontal antenna, 34: sine weighting circuit,
36: block code,
37: multiplier,
38: second register,
40: 90° phase shifter,
41: transmission first carrier generation circuit,
42: transmission second carrier generation circuit,
43: adder,
44: detection circuit,
45: comparator,
46: reference level circuit,
47: clock production circuit,
48: time base signal thinning circuit,
51: receiving first carrier generation circuit,
52: receiving second carrier generation circuit,
53: adder,
54: stereotyped information generation circuit,
55: switch,
56: multiplier,
57: receiving digital clock circuit,
58: delta-sigma analog-to-digital conversion circuit,
61: digital information signal circuit,
62: parallel-to-serial conversion circuit,
63: multiplier,
64: block code generation circuit,
65: assembler,
66: digital filter,
67: circularly polarized wave frequency 90° phase shifter,
68: transmission circularly polarized wave carrier digital signal generation circuit,
69: transmission ΔΣ DAC,
70: transmission ΔΣ DAC,
71: receiving circularly polarized wave carrier digital signal generation circuit,
72: digital filter,
73: receiving ΔΣ DAC,
74: receiving carrier frequency carrier digital signal generation circuit,
75: sample-and-hold circuit,
82: digital filter,
83: receiving ΔΣ DAC,
85: sample-and-hold circuit,
87: phase shifter,
88: second digital circuit,
91: circularly polarized wave frequency 90° phase shifter,
92: digital filter,
93: receiving ΔΣ DAC,
95: sample-and-hold circuit,
100: elevator system,
101: building,
102: base station wireless unit,
103: base station two-orthogonal polarizations integrated antenna,
111: car,
112: terminal station wireless unit,
113: terminal station two-orthogonal polarizations integrated antenna,
200: transforming facility monitoring system,
201: transforming apparatus,
202: terminal station two-orthogonal polarizations integrated antenna,
203: terminal station wireless unit,
211: wireless base station,
212: base station two-orthogonal polarization integrated antenna,
213: base station wireless unit,
370: transmitting antenna,
371: fixture,
372: electromagnetic wave reflecting object,
375: transmitter,
380: receiving antenna,
385: receiver,
391: transmission wave,
393: transforming apparatus,
392: receiving wave,
395: transmission wave,
396: receiving wave,
397: reflected wave.

The invention claimed is:

1. A highly secure wireless communication system comprising:
a transmitter that transmits one piece of information at predetermined different angles of polarization of a circularly polarized wave associated with a rotational frequency of a circularly polarized wave frequency carrier and a transmission frequency of a transmission carrier frequency carrier, and signals to which the information is convoluted are weighted by cosine and sine functions, respectively, with the rotational frequency; and
a receiver that restores receiving information in relation to the predetermined angles of polarization, and compares the results of restoration, which relate to the predetermined angles of polarization, with one another; wherein
the transmitter divides the rotational frequency of a circularly polarized wave which is higher than the frequency of the information, allocates different codes to the divisions of the rotational frequency, convolutes the codes to the information, and transmits the information as a transmission signal;
the receiver compares the results of restoration of codes, which are contained in a receiving signal, with one another;
the transmitter generates dummy information in relation to a specific angle of polarization of a transmission polarized wave; and
the receiver decodes the codes, which are contained in the receiving signal, in relation to the predetermined angles of polarization, identifies the code with which an external intruder adversely affects the information, adds the dummy information to the information in relation to an angle of polarization at which the identified code is transmitted, and transmits the information and the dummy information.

2. The highly secure wireless communication system according to claim 1, wherein the codes have a circulatory property.

3. The highly secure wireless communication system according to claim 1, wherein wireless units each including the transmitter and receiver transmit or receive information using stereotyped information which the wireless units retain in common, and the transmission timing of the information is recognized based on transmitting or receiving of the stereotyped information.

4. The highly secure wireless communication system according to claim 3, wherein the wireless unit transmits the stereotyped information in response to acknowledgement of the stereotyped information received, and transmits the stereotyped information before transmitting the information.

5. The highly secure wireless communication system according to claim 1, wherein the circularly polarized wave is produced with a wave obtained by adding up two carriers having different frequencies.

6. The highly secure wireless communication system according to claim 1, wherein a signal to which the information is convoluted is digitally converted into a signal having a highly carrier frequency by a delta sigma circuit.

7. The highly secure wireless communication system according to claim 1, wherein a receiving wave having a carrier frequency is digitally converted to a wave, which falls within a lower frequency band of the circularly polarized wave, by a delta sigma circuit.

8. The highly secure wireless system according to claim 1, wherein two antennas whose polarizations are orthogonal to each other are used to produce the circularly polarized wave.

9. The highly secure wireless system according to claim 8, wherein two antennas whose polarizations are orthogonal to each other are two linear polarization antennas that are spatially orthogonal to each other.

10. The highly secure wireless communication system according to claim 1, wherein the frequency of the circularly polarized wave is ten times or more higher than the upper-limit frequency of the information and ten times or more lower than the frequency of a carrier.

11. A highly secure wireless communication system comprising:
- a transmitter that transmits one piece of information at predetermined different angles of polarization of a circularly polarized wave associated with a rotational frequency of a circularly polarized wave frequency carrier and a transmission frequency of a transmission carrier frequency carrier, and signals to which the information is convoluted are weighted by cosine and sine functions, respectively, with the rotational frequency; and
- a receiver that restores receiving information in relation to the predetermined angles of polarization, and compares the results of restoration, which relate to the predetermined angles of polarization, with one another; wherein
- the transmitter divides the rotational frequency of a circularly polarized wave which is higher than the frequency of the information, allocates different codes to the divisions of the rotational frequency, convolutes the codes to the information, and transmits the information as a transmission signal;
- the receiver compares the results of restoration of codes, which are contained in a receiving signal, with one another;
- the transmitter generates dummy information in relation to a specific angle of polarization of a transmission polarized wave; and
- the receiver decodes the codes, which are contained in the receiving signal, in relation to the predetermined angles of polarization, identifies the code with which an external intruder adversely affects the information, replaces the information with the dummy information in relation to the angle of polarization at which the identified code is transmitted, and transmits the information replaced with the dummy information.

* * * * *